(12) United States Patent
Dobbs

(10) Patent No.: US 8,576,080 B1
(45) Date of Patent: Nov. 5, 2013

(54) GRIP RESPONSIVE SLEEP ALERT SYSTEM AND METHOD

(76) Inventor: Donald Dobbs, Kendall, FL (US)

(*) Notice: Subject to any disclaimer, the term of this patent is extended or adjusted under 35 U.S.C. 154(b) by 327 days.

(21) Appl. No.: 13/070,041

(22) Filed: Mar. 23, 2011

Related U.S. Application Data (63) Continuation-in-part of application No. 12/915,597, filed on Oct. 29, 2010.

(60) Provisional application No. 61/317,482, filed on Mar. 25, 2010.

(51) Int. Cl.
*G08B 23/00* (2006.01)

(52) U.S. Cl.
USPC .......... 340/575; 340/576

(58) Field of Classification Search
USPC .......... 340/575, 573.1, 576
See application file for complete search history.

(56) References Cited

U.S. PATENT DOCUMENTS

| | | | | |
|---|---|---|---|---|
| 4,210,905 A | * | 7/1980 | Coons | 340/575 |
| 5,493,276 A | * | 2/1996 | Alvira | 340/576 |
| 5,969,616 A | * | 10/1999 | Tschoi | 340/576 |
| 6,218,947 B1 | * | 4/2001 | Sutherland | 340/576 |
| 6,590,499 B1 | * | 7/2003 | D'Agosto | 340/575 |
| 7,710,279 B1 | * | 5/2010 | Fields | 340/575 |
| 2004/0032334 A1 | * | 2/2004 | Haq | 340/575 |
| 2008/0042856 A1 | * | 2/2008 | Power | 340/575 |

* cited by examiner

*Primary Examiner* — Toan N Pham
(74) *Attorney, Agent, or Firm* — H. John Rizvi; Gold & Rizvi, P.A.

(57) ABSTRACT

A grip responsive sleep alert system includes a normally-closed trigger mechanism, an audible alert device electrically connected to the trigger mechanism and a battery electrically connected to the trigger mechanism and the audible alert device.

4 Claims, 6 Drawing Sheets

GRIP RESPONSIVE SLEEP ALERT SYSTEM AND METHOD

CROSS-REFERENCE TO RELATED APPLICATION

This application is a continuation-in-part of application Ser. No. 12/915,597, filed on Oct. 29, 2010, which application is incorporated by reference herein in its entirety and claims the benefit of co-pending U.S. Provisional Patent Application Ser. No. 61/317,482, filed on Mar. 25, 2010, which is incorporated herein in its entirety.

BACKGROUND OF THE INVENTION

1. Field of the Invention

The present invention relates generally to a sleep-preventing alarm system. The invention is, however, more particularly directed to a grip responsive sleep alert system and method, for providing an audible alert to preclude a driver of a motor vehicle or any other user from falling asleep with a sleep-preventing alarm.

2. Description of the Prior Art

Driver fatigue and falling asleep at the wheel is a major cause of car crashes. Fatigue can be very difficult to identify as the source of accidents because estimates are made based almost solely on police reports and driver statements. Estimates are that 10-20% of fatal accidents and about 5 to 10% of all car accidents may be related to tired drivers.

According to the National Highway Traffic Safety Administration, there may be as many as 100,000 crashes resulting from driver fatigue each year, with an estimated 1,550 deaths, 71,000 people injured, causing $12.5 billion economic losses. These figures may be the tip of the iceberg, since currently it is difficult to attribute crashes to sleepiness.

In accordance with a recent survey, more than 10 percent of drivers admit to having fallen asleep at the wheel, while more than 20 percent say they have momentarily dozed while driving, according to a study of 1,024 drivers. Referred to as "the silent killer" because it is so often overlooked as the cause of an accident, drowsy driving's full effect is not yet known because reporting is imprecise, police are not trained to detect sleep-related crashes and there is no device to determine whether someone was driving while dangerously drowsy.

Some of the tactics drivers resort to in an effort to fight drowsiness on the road are, in descending order, stop driving or switch drivers, open the windows or turn on the air conditioning, listen to the radio or CDs, stop eating or drinking, drink caffeine, among others.

Another method drivers have used to stay awake at the wheel include talking or singing to themselves, splashing water in their faces and slapping, hitting, or pinching themselves.

Sleep deprivation is a common problem not only for car drivers but also among airline pilots and other workers who are required to perform any type of tasks over a prolonged period of time. Just as an example, on Mar. 4, 2004, a commercial pilot and his first officer fell asleep while approaching Denver International Airport in an A319 Airbus jet, going twice the speed as allowed, according to a report from the Federal Aviation Administration (FAA).

Loss of sleep and fatigue in these settings can significantly impair cognitive function, and can lead to dangerous decrements in human performance. In particular, falling asleep at the controls of a commercial vehicle such as a truck, tanker, or airplane can lead to potentially catastrophic consequences. Besides the transportation context, drastic consequences may result by an operator falling asleep at the controls of a nuclear power plant, an electrical power grid, or other system that could impact many lives.

There are several patents in the prior art related to devices and methods for providing an audible alert to the user. For example, a sleep alert apparatus adapted to be worn upon the head of the operator of a transportation vehicle includes a baseball-type cap, a flexible pouch attached to the exterior surface of a side portion of the cap, an upwardly directed entrance opening, and a tilt monitoring device removably inserted into the pouch. The tilt monitoring device includes a housing confining a gravity activated switch, a noise generator, and a battery power source.

Another example is a fatigue alarm comprising a housing, with the housing including a first fixed handle plate extending from the housing and a second movable handle plate separated from the first handle plate in a biased separation relative to one another, such that a first electrical contact secured to the second handle plate within the housing is in contiguous communication with a second electrical contact within the housing in a normal configuration, such that upon separation of the first electrical contact relative to the second electrical contact against a spreader member within the housing effects disengagement and deactivation of an audible alarm, whereupon fatigue permits movement of the second handle plate away from the first handle plate to engage the first electrical contact and the second electrical contact to actuate the audible alarm to alert an individual at an onset of sleep.

There is also an apparatus known which decides the presence or absence of an anomaly by detecting the gripped state of a steering wheel by the driver steering a road vehicle, or by measuring fluctuations in the heart rate and heartbeat period of the driver, and which issues an alarm of "Take a rest", etc. or control the vehicle speed to be lowered, if any anomaly occurs. A detecting means is attached to a steering wheel, steering wheel cover or a band-shaped member. The detecting means comprises a plurality of reflection type optical sensors, which are each composed of a light emitting element and one or lighter receiving elements, and which are set in such proper arrangement and orientation as to permit detection in any of various conditions.

An alarm system formed by a wrapper includes an energy source, an operator grip pressure controlled switch, an orientation responsive switch, and an audio resonator is also known. The wrapper is secured to an operator controllable member, such as a steering wheel, by being folded over the member upon itself and secured using, for example, a fabric fastener interlock. In operation, the user places his/her hand upon the pressure control switch included within the wrapper. When the grip of the user becomes relaxed, for example, due to inattention or fatigue, the switch operates the resonator and an alarm is sounded. The orientation responsive switch controls disablement and enablement of the alarm system in response to displacement of the operator controllable member.

Another grip responsive alert system includes a pressure sensor associated with a mechanism for controlling a vehicle. The pressure sensor detects operator fatigue as exhibited by a change in operator pressure on the control mechanism. An operator stimulus is coupled to the pressure sensor and, upon sensing fatigue, produces a stimulus such as a visual or audible alarm whereby alertness of the operator is maintained.

The above cited solutions are basically focused on waking the driver, but this is not an appropriate solution to this serious problem. Just as an example, a vehicle traveling at 60 miles per hour (MPH) goes 88 ft. per second, almost a football field every 4 seconds. Sleep must be prevented instead of waking a driver.

Those devices for detecting the movement of the driver's head involve a delay needed to run the process that it is not acceptable. Every road has a crown for water runoff. On a common one lane each way road, the crown is in the middle, therefore when the driver falls asleep, the vehicle is directed to steer slightly left. Every vehicle has the front wheel geometry adjusted to causing the vehicle to travel in a straight line when there is no driver physical input. That would be fine if the driver only travels across two-lane roads. However, if the driver is on a four or more lane road, the steering geometry increases a left steering action, and a crossover accident may be imminent.

Even though the above cited systems and devices for awaking an operator address some of the needs of the market, an economical and simple sleep alert system to prevent the operator from failing asleep, may be used by different type of users, including car drivers, airline pilots, security personnel, among others, is still desired.

SUMMARY OF THE INVENTION it is therefore an object of the present invention to provide a grip responsive sleep alert system and method that are suited to keep an operator awake during a sensitive or dangerous operation, for example, driving a car, flying an aircraft, etc.

It is a further object of the present invention to provide an improved sleep detection and driver alert apparatus that utilizes a trigger-like mechanism that engages and disengages an audible alarm.

It is also a further object of the present invention to provide a grip responsive sleep alert system that determines changes in the operator attention via a relaxation of the muscles that hold the trigger mechanism open.

Yet an object of the present invention is to provide an improved grip responsive sleep alert system and method that can provide an audible alarm in order to awaken or alert a sleepy driver.

It is a further object of the present invention to provide an improved grip responsive sleep alert apparatus that it is possible to calibrate to assure proper operation with users of different sizes, strengths, and other physical characteristics.

Accordingly, it is a primary object of the present invention to provide an improved grip responsive sleep alert system defined by a portable device.

In summary, the present invention is related to a grip responsive sleep alert system comprising a housing including a trigger mechanism electrically connected to a first electrical contact, and a second electrical contact attached to the housing and connected to a battery and to an audible alert device. The first and second electrical contacts are normally in contact between each other, such that the first electrical contact secured to the trigger mechanism is in contiguous communication with the second electrical contact attached to the housing normal configuration. Upon activation of the trigger mechanism and separation of the first electrical contact relative to the second electrical contact effects disengagement and deactivation of an audible alarm, whereupon fatigue permits the first electrical contact and the second electrical contact to actuate the audible alarm to alert an individual at the onset of sleep.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF REPRESENTATIVE EMBODIMENTS

Figure 1:
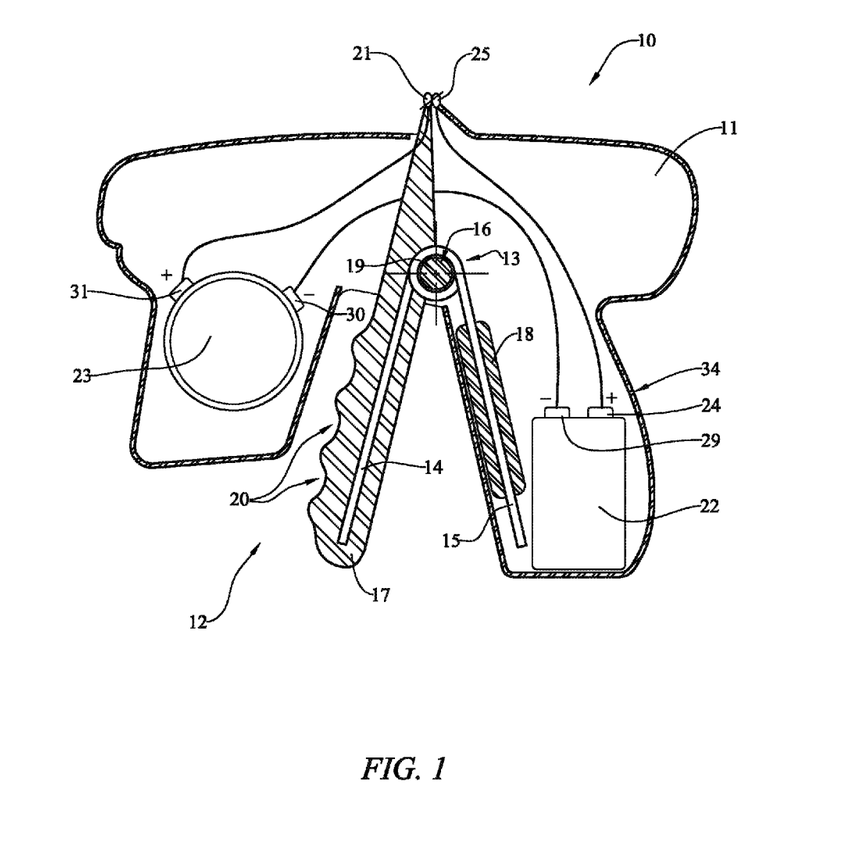
FIG. 1 is a schematic cross sectional view of the grip responsive sleep alert system in accordance with the present invention. This figure shows the trigger mechanism in its normal closed position.
Figure 2:
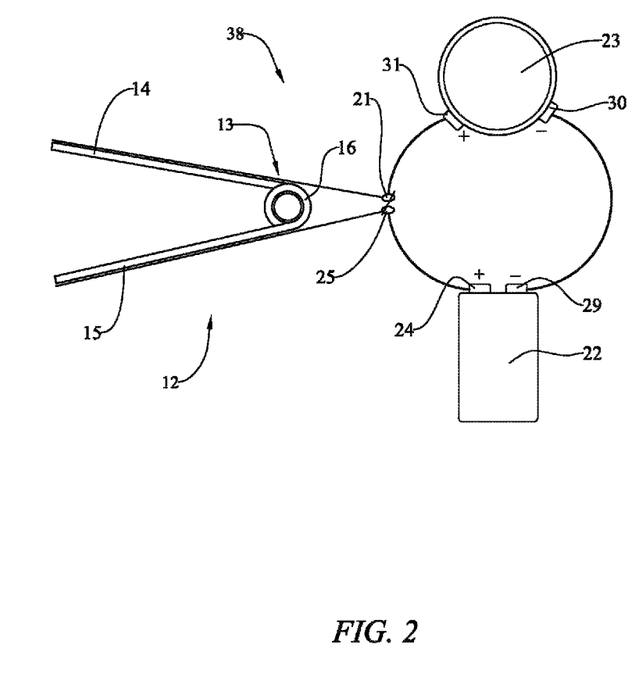
FIG. 2 illustrates schematically one possible embodiment of the electrical circuit of the present invention.
Figure 3:
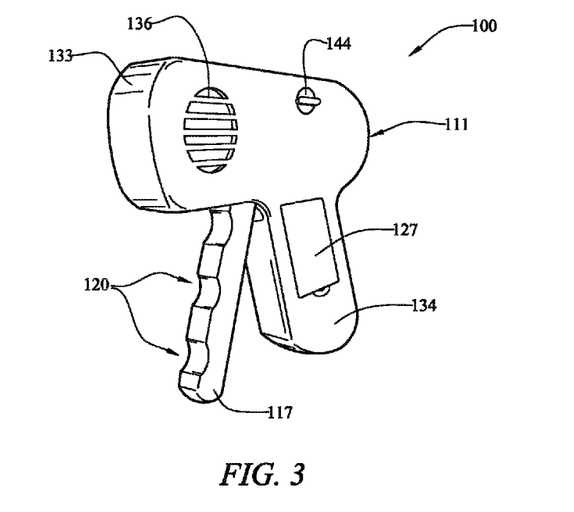
FIG. 3 is a front perspective view of an alternative illustrative embodiment of the grip responsive sleep alert system.
Figure 4:
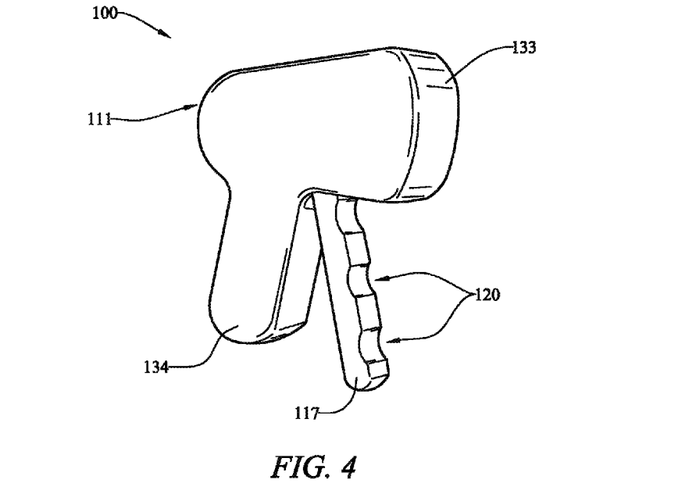
FIG. 4 is a front perspective view of the grip responsive sleep alert system opposite the side illustrated in FIG. 3.
Figures 5, 6:
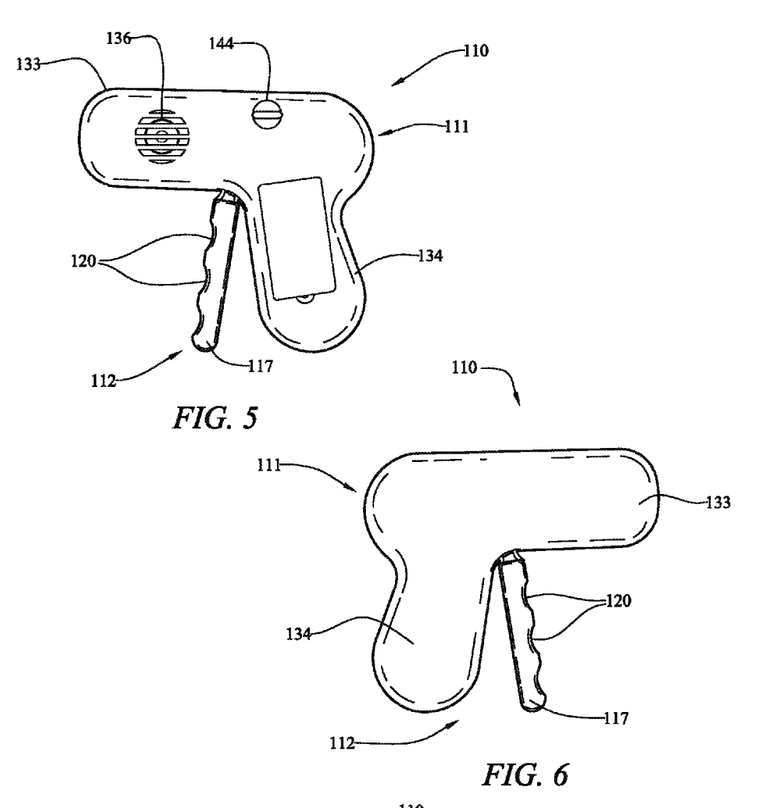
FIG. 5 is a side view of the grip responsive sleep alert system illustrated in FIG. 3.
FIG. 6 is a side view of the grip responsive sleep alert system opposite the side illustrated in FIG. 5.
Figure 7:
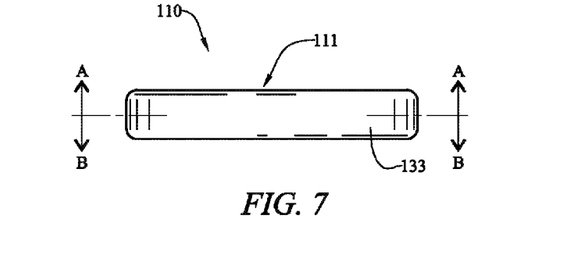
FIG. 7 is a top view of the alternative illustrative embodiment of the grip responsive sleep alert system illustrated in FIG. 3.

Referring initially to FIGS. 1 and 2 of the drawings, the invention is directed to a grip responsive sleep alert system 10 comprising a housing 11 including a trigger mechanism 12. The trigger mechanism 12 may include a torsion spring 13 having first and second torsion spring arms 14 and 15, respectively, connected to a spiral spring portion 16. In some embodiments, the torsion spring 13 may have a steel construction. The first torsion spring arm 14 is fitted with a plastic movable handle 17, the second torsion spring arm 15 is fitted with a stationary holder 18 which may be integral to the housing 11 and the circular spring portion 16 is mounted on a stationary fulcrum 19 which may also be integral to the housing 11. In some embodiments, the fulcrum 19 may be a stationary pin which is integral to the housing 11.

The handle 17 may include a series of finger indentations 20 and a movable electrical contact 21. Into the same housing 11, a battery 22 and a buzzer 23 or other audible alert device are also lodged. In various embodiments the battery 22 may include a 9-volt battery, AA batteries, AAA batteries or any other type of battery which is suitable for the purpose. The positive terminal 24 of the battery 22 is electrically connected to a stationary electrical contact 25 which may be attached to the housing 11. The negative terminal 29 of the battery 22 is electrically connected to a negative terminal 30 of the buzzer 23. Moreover, a positive terminal 31 of the buzzer 23 is connected to the movable electrical contact 21 on the handle 17.

The housing 11 may have different shapes, but in the illustrated embodiment the device includes a handle portion 34 that generally resembles a pistol handle and the handle 17 that generally resembles a gripper.

The grip-responsive sleep alert system 10 is normally maintained in a closed or activated position via the biasing action of the torsion spring 13 when the handle 17 of the trigger mechanism 12 is released; therefore, the buzzer 23 is normally activated when the handle 17 is in the resting position illustrated in FIG. 1 in which the movable electrical contact 21 is brought into contact with the stationary electrical contact 25. The buzzer 23 can be maintained in a deactivated state by having a user (not illustrated) manually squeeze the handle 17 toward the handle portion 34 such that the handle 17 pivots about the fulcrum 19 against the bias imparted by the torsion spring 13 and the movable electrical contact 21 disengages the stationary electrical contact 25. In order to avoid activation of the buzzer 23 when the user must perform some task in which both hands are needed (for example, paying a toll while driving, or going to the bathroom) a piece of paper, or a card (not illustrated) may be inserted between the movable electrical contact 21 and the stationary electrical contact 25 to prevent inadvertent electrical contact between the movable electrical contact 21 and the stationary electrical contact 25.

In exemplary application, the grip-responsive sleep alert system 10 can be used to prevent a driver (not illustrated) of a vehicle from inadvertently falling asleep during operation of the vehicle. When the user is driving, he/she must maintain the trigger mechanism 12 formed by handle 17 and the handle portion 34 of the housing 11 in a squeezed configuration to prevent activation of the buzzer 23. Accordingly, as the trigger mechanism 12 is squeezed, the handle 17 is rotated counter-clockwise around the fulcrum 19 against the bias imparted by the torsion spring 13. Consequently, the movable electrical contact 21 attached to the handle 17 disengages the stationary electrical contact 25. Therefore, the electrical circuit which is defined between the battery 22 and the audible alert device or buzzer 23 is opened or deactivated. The buzzer 23 of the grip responsive sleep alert system 10 is activated when the user releases the trigger mechanism 12 such that the torsion spring 13 pivots the handle 17 in the clockwise direction on the fulcrum 19 and the movable electrical contact 21 is brought into contact with the stationary electrical contact 25.

Research has demonstrated that one of the consequences of fatigue is immediate relaxation of muscular tension. Therefore, in this particular case, muscular relaxation which is induced by sleep will cause the user to release the handle 17, resulting in activation of the buzzer 23.

FIG. 2 illustrates schematically one possible embodiment of an electrical circuit 38 which is suitable for implementation of the grip responsive sleep alert system 10. The electrical circuit 38 may include the battery 22, the movable electrical contact 21, the stationary electrical contact 25 and the buzzer 23 or other audible alert device. The electrical circuit 38 may include other elements such as adjusting elements and sensibility elements, for example and without limitation.

It is also important to point out that the housing 11 and the electrical contacts 21, 25 may have many different forms without departing from the main idea introduced by the present invention. For example and without limitation, instead of having a gripper shape, the housing 11 may have a pistol-like shape that the user must grip firmly to prevent the buzzer 23 or other audible alert device from being activated.

Figure 8:
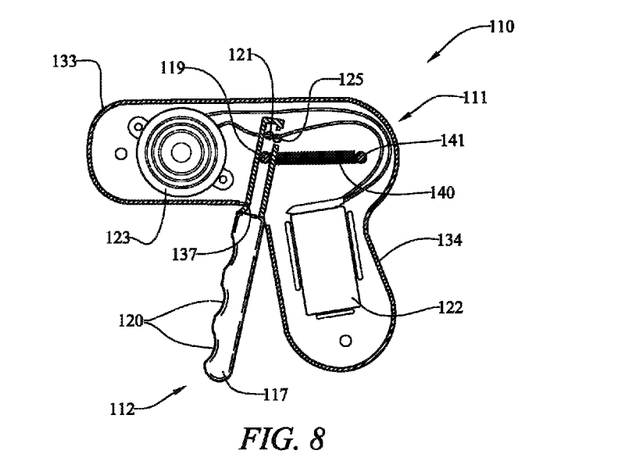
FIG. 8 is a sectional view of the alternative illustrative embodiment of the grip responsive sleep alert system illustrated in FIG. 3, with the system deployed in an activated state.
Figure 9:
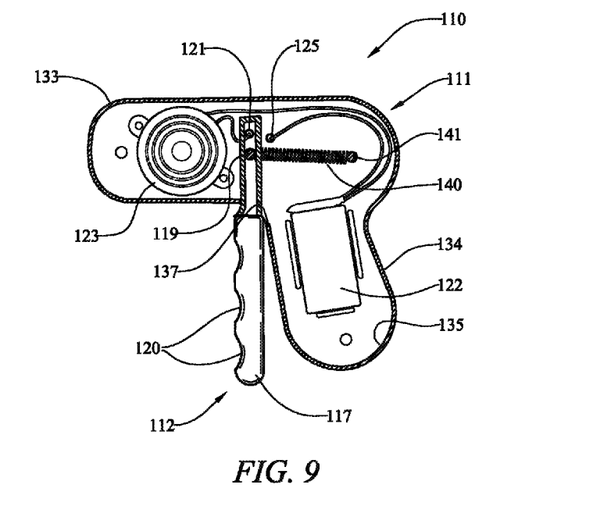
FIG. 9 is a sectional view of the alternative illustrative embodiment of the grip responsive sleep alert system illustrated in FIG. 3, with the system deployed in an inactivated state.
Figure 10:
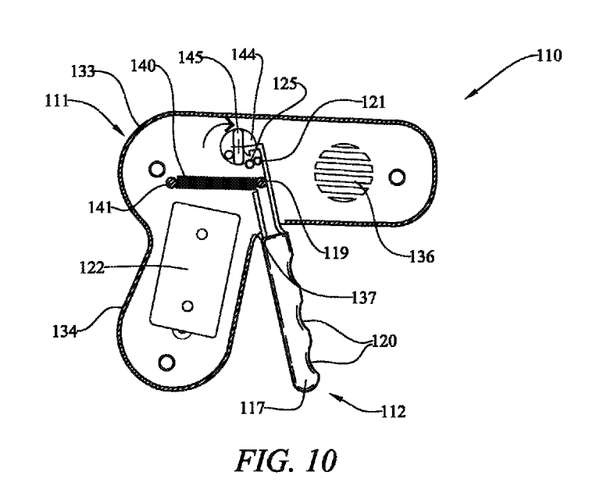
FIG. 10 is a sectional view of the alternative illustrative embodiment of the grip responsive sleep alert system illustrated in FIG. 3, with the system deployed in the activated state and more particularly illustrating an unlocking configuration of a handle retention dial on the system.
Figure 11:
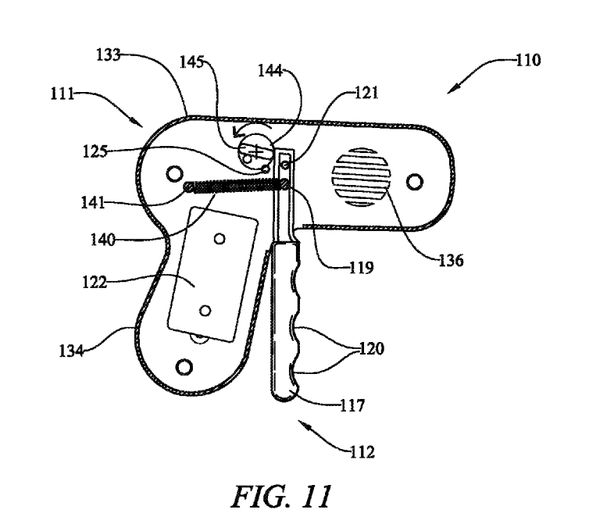
FIG. 11 is a sectional view of the alternative illustrative embodiment of the grip responsive sleep alert system illustrated in FIG. 3, with the system deployed in the inactivated state and more particularly illustrating a locking configuration of the handle retention dial.

Referring next to FIGS. 3-11 of the drawings, an alternative illustrative embodiment of the grip-responsive sleep alert system is generally indicated by reference numeral 100. The grip-responsive sleep alert system 100 may include a housing 111 having a generally elongated housing body 133 and a handle portion 134 which extends from the housing body 133. As illustrated in FIGS. 9-11, a battery compartment 135 may be contained in the handle portion 134 of the housing 111. A detachable battery cover 127 (FIG. 3) may be provided on the handle portion 134 to selectively conceal or open the battery compartment 135. A speaker opening 136 may be provided in at least one side of the housing body 133 of the housing 111. A handle opening 137 (FIGS. 8-11) may be provided in the housing 111 between the housing body 133 and the handle portion 134.

A trigger mechanism 112 may include a generally elongated handle 117 which extends from the interior of the housing 111 through the handle opening 137. As illustrated in FIGS. 8-11, the handle 117 may be pivotally mounted in the housing 111 about a fulcrum 119. A movable electrical contact 121 may be provided on the portion of the handle 117 which is inside the housing 111. A stationary electrical contact 125 may be provided in the housing 111 generally adjacent to the movable electrical contact 121. Accordingly, the handle 117 is capable of pivoting between the activated state in FIG. 8, in which the handle 117, under actuation by a tension spring 140 (hereinafter described), moves the movable electrical contact 121 into contact with the stationary electrical contact 125, and the inactivated state in FIG. 9, in which the handle 117 moves the movable electrical contact 121 out of contact with the stationary electrical contact 125 responsive to manual grip pressure applied to the trigger mechanism 112. In some embodiments, multiple finger indentations 120 may be provided in the portion of the handle 117 which is exterior to the housing 111.

A tension spring 140 may be provided in the housing 111. The tension spring 140 may include a first end which is attached to the fulcrum 119 and a second end which is attached to a spring tab 141 disposed in spaced-apart relationship to the fulcrum 119. Accordingly, as illustrated in FIG. 8, the tension spring 140 normally pulls against the handle 117 and biases the movable electrical contact 121 into engagement with the stationary electrical contact 125. Conversely, as illustrated in FIG. 9, the handle 117 may be squeezed toward the handle portion 134 of the housing 11 to pivot the handle 117 against the bias imparted by the tension spring 140 and move the movable electrical contact 121 out of engagement with the stationary electrical contact 125.

A buzzer 123 or other audible alert device may be provided in the housing body 123 of the housing 111. The buzzer 123 may interface with the speaker opening or openings 136 in the housing body 133. A battery 122 may be provided in the battery compartment 135 provided in the handle portion 134 of the housing 111. A positive terminal (not illustrated) of the battery 122 may be electrically connected to the stationary electrical contact 125. A negative terminal (not illustrated) of the battery 122 may be electrically connected to a negative terminal (not illustrated) of the buzzer 123. A positive terminal (not illustrated) of the buzzer 123 may be electrically connected to the movable electrical contact 121 on the handle 117. Accordingly, when the tension spring 140 biases the handle 117 in the released position illustrated in FIG. 8, the movable electrical contact 121 contacts the stationary electrical contact 125, completing the electrical circuit between the battery 122 and the buzzer 123 and thereby activating the buzzer 123. Conversely, when the handle 117 is squeezed and pivoted toward the handle portion 134 of the housing 111 against the bias imparted by the tension spring 140, as illustrated in FIG. 9, the movable electrical contact 121 disengages the stationary electrical contact 125, opening the electrical circuit between the battery 122 and the buzzer 123 and thereby inactivating the buzzer 123.

As illustrated in FIGS. 10 and 11, in some embodiments, a rotatable handle retention dial 144 may be provided on the housing 111. A handle retention tab 145 may be provided on the handle retention dial 144. Accordingly, as illustrated in FIG. 10, the handle retention dial 144 may be selectively rotated to a "release" position in which the side of the handle retention tab 145 engages the handle 117 and allows contact between the movable electrical contact 121 and the stationary electrical contact 125. As illustrated in FIG. 11, the handle retention dial 144 may be selectively rotated to a "locked" position such that the end of the handle retention tab 145 engages the handle 117 and pivots the handle 117 and the movable electrical contact 121 moves away from the stationary electrical contact 125 without a user's having to squeeze the handle 117 toward the handle portion 134 of the housing 111 for the purpose.

Exemplary application of the grip-responsive sleep alert system 100 may be as was heretofore described with respect to the grip-responsive sleep alert system 1 in FIGS. 1 and 2. Accordingly, the handle rotation dial 144 may be normally deployed in the "locked" position illustrated in FIG. 11, in which the end of the handle retention tab 145 engages and biases the movable electrical contact 121 away from the stationary electrical contact 125 and thereby prevents inadvertent activation of the buzzer 123. Prior to use of the grip-responsive sleep alert system 100, the handle retention dial 144 is initially rotated from the "locked" position (FIG. 11) to the "release" position (FIG. 10) such that the movable electrical contact 121 is able to approach and contact the stationary electrical contact 125 under influence of the tension spring 140 in the absence of grip pressure applied to the handle 117. As the handle retention dial 144 is rotated from the "locked" position to the "release" position, grip pressure may be applied to the handle 117 to prevent inadvertent contact between the movable electrical contact 121 and the stationary electrical contact 125 and undesired activation of the buzzer 123.

During driving or other activity in which the user of the grip-responsive sleep alert system 100 is to remain awake, the user maintains grip pressure on the handle 117 to maintain the movable electrical contact 121 out of contact with the stationary electrical contact 125. In the event that the user begins to drift, off to sleep, the muscles in the user's arm which maintain grip pressure on the handle 117 are relaxed. Consequently, the tension spring 140 pivots the handle 117 with respect to the fulcrum 119 and the movable electrical contact 121 contacts the stationary electrical contact 125. This action closes the circuit between the battery 122 and the buzzer 123, activating the buzzer 123 and awakening the user such that the user can pay attention to driving or other activity which requires the vigilance and attention of the user. Under circumstances in which the user must perform some task in which both hands are needed, the handle retention dial 144 can be selectively rotated from the "release" position (FIG. 10) to the "locked" position (FIG. 11) to prevent the tension spring 140 from pivoting the handle 117 and the movable electrical contact 121 from contacting the stationary electrical contact 125. Prior to resuming driving or other activity, the handle retention dial 144 can be returned from the "locked" position to the "release" position and grip pressure applied to the handle 117 as before.

While the preferred embodiments of the invention have been described above, it will be recognized and understood that various modifications can be made in the invention, and the appended claims are intended to cover all such modifications which may fall within the spirit and scope of the invention.

I claim:

1. A grip responsive sleep alert system, comprising:
   a housing;
   a trigger mechanism including a handle pivotally carried by the housing and positional between first and second positions and a coiled tension spring normally biasing the handle in the first position;
   a stationary electrical contact carried by the housing;
   a movable electrical contact carried by the handle and disposed in electrical contact with the stationary electrical contact when the handle is in the first position and disengaging the stationary electrical contact when the handle is in the second position;
   an audible alert device electrically connected to a first one of the movable electrical contact and the stationary electrical contact;
   a battery electrically connected to the audible alert device and a second one of the movable electrical contact and the stationary electrical contact; and
   a rotatable handle retention dial having a handle retention tab carried by the housing and rotatable to first and second configurations, the handle retention tab disengaging the handle and facilitating positioning of the handle in the first position when the handle retention dial is in the first configuration and the handle retention tab engaging and biasing the handle in the second position when the handle retention dial is in the second configuration.

2. The grip responsive sleep alert system of claim 1 wherein the housing comprises a generally elongated housing body and a handle portion extending from the housing body generally adjacent to the handle.

3. The grip responsive sleep alert system of claim 1 further comprising at least one speaker opening in the housing and wherein the audible alert device interfaces with the at least one speaker opening.

4. The grip responsive sleep alert system of claim 1 wherein the audible alert device comprises a buzzer.

* * * * *